US009347518B1

(12) United States Patent
Fan et al.

(10) Patent No.: US 9,347,518 B1
(45) Date of Patent: May 24, 2016

(54) VIBRATION-ISOLATING BRACKET ASSEMBLY

(71) Applicant: FORD GLOBAL TECHNOLOGIES, LLC, Dearborn, MI (US)

(72) Inventors: Sixin Fan, Novi, MI (US); Mohammad Olfatnia, Ann Arbor, MI (US); Yi Zhang, Ann Arbor, MI (US); Daniel M Cragel, Dearborn, MI (US); David Charles Secco, Woodhaven, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/698,892

(22) Filed: Apr. 29, 2015

(51) Int. Cl.
*F16F 15/08* (2006.01)
*F16F 1/38* (2006.01)
*F16M 13/02* (2006.01)

(52) U.S. Cl.
CPC . *F16F 15/08* (2013.01); *F16F 1/38* (2013.01); *F16M 13/02* (2013.01)

(58) Field of Classification Search
CPC ............. F16F 15/08; F16F 1/38; F16M 13/02
USPC ........................................................ 248/636
See application file for complete search history.

(56) References Cited

U.S. PATENT DOCUMENTS

| 2004/0188900 | A1* | 9/2004 | Okumura | F16F 13/18 267/140.11 |
| 2005/0217918 | A1* | 10/2005 | Endo | F16F 1/387 180/291 |
| 2007/0085249 | A1* | 4/2007 | Happou | F16F 13/262 267/140.13 |
| 2008/0054538 | A1* | 3/2008 | Igami | B60K 5/1216 267/140.11 |
| 2013/0292888 | A1* | 11/2013 | Hwang | F16F 13/08 267/140.13 |
| 2015/0060633 | A1* | 3/2015 | Han | F16F 13/10 248/562 |
| 2015/0129742 | A1* | 5/2015 | Okanaka | B60K 5/1208 248/634 |

FOREIGN PATENT DOCUMENTS

| JP | 2008185193 A | | 8/2008 |
| KR | 100820712 A | * | 4/2008 |
| KR | 100820712 B1 | | 4/2008 |
| WO | 2010080955 A1 | | 7/2010 |

* cited by examiner

*Primary Examiner* — Mark Wendell
(74) *Attorney, Agent, or Firm* — Gregory P. Brown; Law Firm of Dr. Junqi Hang, PLC

(57) ABSTRACT

In one or more embodiments, a vibration-isolating bracket assembly includes an elastic donut including a main aperture, a first bracket including a tongue with at least a portion thereof being received within the main aperture, the tongue including a first through-aperture, a first portion of the elastic donut being received within the first through-aperture, and a second bracket to support the elastic donut.

19 Claims, 3 Drawing Sheets

VIBRATION-ISOLATING BRACKET ASSEMBLY

TECHNICAL FIELD

The present invention in one or more embodiments relates to a vibration-isolating bracket assembly.

BACKGROUND

Often, vehicles may have one or more parts with vibration source, such as a pump, valve or actuator, etc. In modern vehicle designs, one or more brackets may be employed to connect the parts with vibration source to other parts in vehicle, such as vehicle body or powertrain.

For instance, publication WO2010/080955 discloses an engine mount assembly including a bushing received in a composite or plastic bracket, and a metal insert extending through a central portion of the bushing.

SUMMARY

In one or more embodiments, a vibration-isolating bracket assembly includes an elastic donut including a main aperture, a first bracket including a tongue with at least a portion thereof being received within the main aperture, the tongue including a first through-aperture, a portion of the elastic donut being received within the first through-aperture, and a second bracket to support the elastic donut. Without wanting to be limited to any particular theory, this configuration is believed to create a mechanical bound between the tongue and the elastic donut in addition to surface bondage, and hence relatively enhanced stability and vibration-absorbance.

The tongue may further include a second through-aperture spaced apart from the first through-aperture. The second bracket may include a housing to receive at least a portion of the elastic donut. The housing may include a wedge portion to limit movement of the elastic donut.

The second bracket may include a second connector portion to connect to a second vehicle part, the wedge portion being positioned between the tongue and the second connector portion.

The elastic donut may further include a pair of supplemental apertures, the main aperture being positioned between the pair of supplemental apertures.

The first bracket may further include a first connector portion to connect a first vehicle part and the second bracket further includes a second connector portion to connect a second vehicle part. The first connector portion and the tongue may be integral to each other in material.

The second bracket further may include a housing to receive at least a portion of the elastic donut and the second connector portion is integral to the housing in material.

The first bracket may differ in material from the second bracket.

The elastic donut may be formed on the tongue via injection molding.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present invention, reference is now made to the one or more embodiments illustrated in greater detail in the accompanying drawings and described below wherein.

DETAILED DESCRIPTION OF ONE OR MORE EMBODIMENTS

Figure 1:
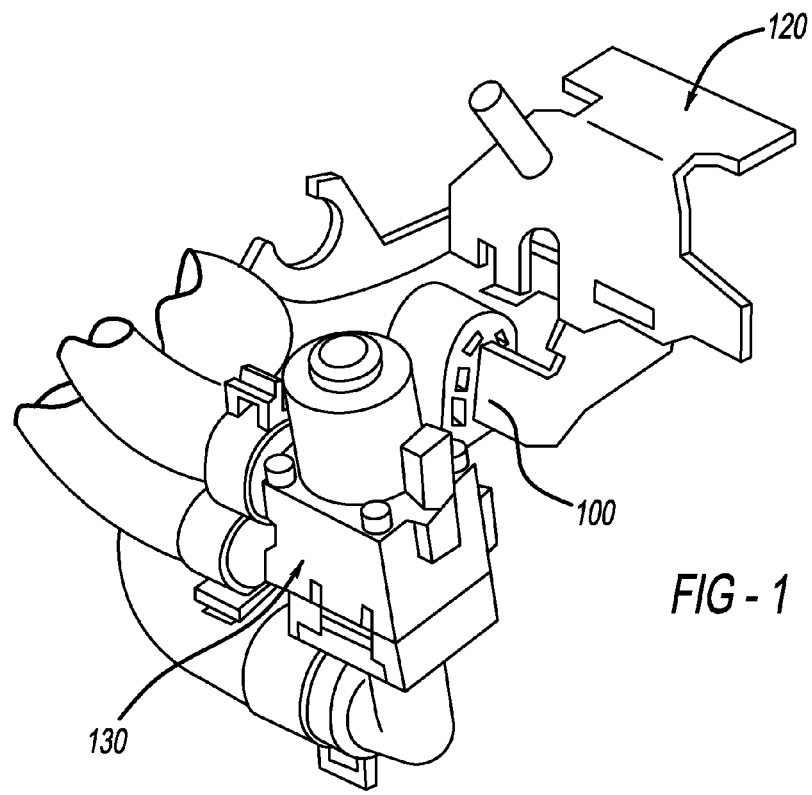
FIG. 1 illustratively depicts a vibration-isolating bracket assembly according to one or more embodiments as positioned relative to first and second vehicle parts for connection.

As referenced in the FIG.s, the same reference numerals may be used to refer to the same parameters and components or their similar modifications and alternatives. These specific parameters and components are included as examples and are not meant to be limiting. The drawings referenced herein are schematic and associated views thereof are not necessarily drawn to scale.

The present invention in one or more embodiments provides a vibration isolating bracket assembly, which may be used to connect parts with vibration source, such as pumps, valves, and actuators, etc., to other vehicle parts, such as body or powertrain. As mentioned herein elsewhere, the vibration-isolating bracket assembly in one or more embodiments is believed to be advantageous at least because it reflects the understanding that it is desirable that a vibration-isolating device or devices provide adequate isolation between the part with vibration source and the part being mounted to, such as the vehicle body. It also reflects the understanding that the vibration-isolating device or devices also provide adequate load bearing capability, in multiple translational or rotational directions, to provide structural support for the mounted part, during all vehicle dynamic conditions.

The vibration-isolating bracket assembly in one or more embodiments is believed to be advantageous also because it reflects the understanding that multiple vibration isolators or bushings are often employed to mount a single part with vibration source to other parts in vehicle, that an alternative is to design multiple attachment features on a single isolator or bushing, and that both of the strategies may not be suitable for situations involving tight packaging space, where multiple bushings, or single isolator with multiple attachment features, will not fit in the available space.

As detailed herein elsewhere, the present invention in one or more embodiments is believed to provide a relatively simple and cost effective design to better isolate the transmission of vibration from the source part to the part mounted to, while providing enhanced structural stability, where translational or rotational movement in a number of directions may be relatively better controlled. This benefit may be particularly useful in situations involving tight packaging space, where existing multiple isolator design, or single isolator with multiple connector design becomes unsuitable.

In one or more embodiments, and in view of FIG. 1 through FIG. 4, a vibration-isolating bracket assembly generally shown at 100 includes an elastic donut 210 with a first or main aperture 310, a first bracket 220 with a tongue 320 at least a portion thereof being received within the main aperture 310, the tongue including a first through-aperture 325, a portion 410 of the elastic donut 210 being received within the first through-aperture 325, and a second bracket 230 to support the elastic donut 210. In certain embodiments, the portion 410 of the elastic donut 210 fills up at least 90 percent or 95 percent of the fillable space available in the first through-aperture 325.

The vibration-isolating bracket assembly 100 may be employed to connect a first vehicle part 120 and a second vehicle part 130, either of which may be of any suitable shape and configuration. In certain embodiments, and in view of FIG. 1, the first vehicle part 120 may be a vehicle frontal enhancing part, the second vehicle part 130 may be a heating valve and/or auxiliary pump common to a vehicle engine and transmission cooling system. Accordingly the vibration-isolating bracket assembly 100 may be used to connect the heating valve to the vehicle frontal enhancing part with enhanced stability, reduction in vibration transmission, hence improved NVH performance. In certain other embodiments, the first and second vehicle parts 120, 130 may be any other suitable vehicle parts, or parts of other structures or vessels such as boats, aircrafts and buildings.

Referring back to FIG. 2 and FIG. 3, the vibration-isolating bracket assembly 100 includes the elastic donut 210 with the main aperture 310. The elastic donut 210 is illustratively depicted as surrounding the main aperture 310 in a rounded shape. In certain embodiments, the elastic donut 210 may be of suitable shape and configuration. In addition, the elastic donut 210 may be of any suitable material, including rubber, plastic, polymer and any combinations thereof. As mentioned herein elsewhere, with the elasticity, the elastic donut 210 may be positioned between the first and second brackets 220, 230 to act and/or function as a cushion to absorb shock and unwanted incoming energy, and to reduce transmission of vibrations between the first and second vehicle parts 120, 130, to provide enhanced stability and durability to the connection between the first and second brackets 220, 230, and reduced occurrences in unwanted rotations and movements there between.

Figure 2:
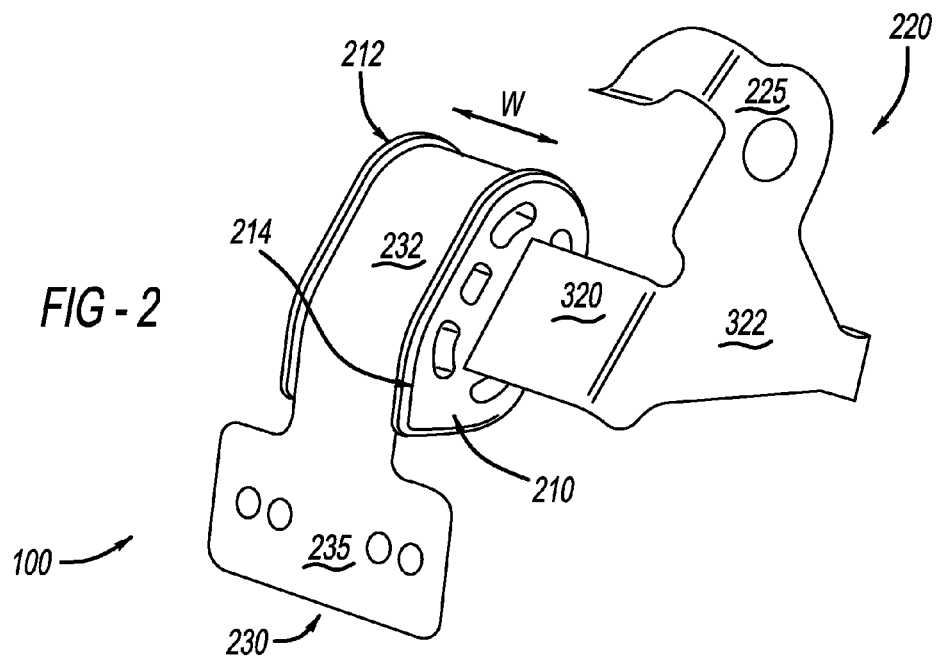
FIG. 2 illustratively depicts an enlarged perspective view of the vibration-isolating bracket assembly referenced in FIG. 1.
Figure 4:
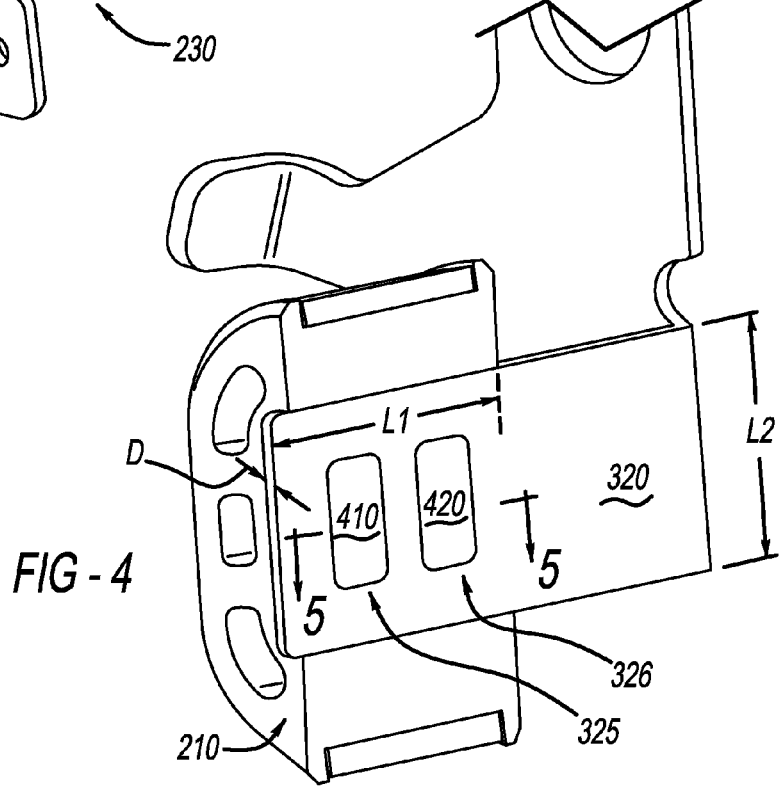
FIG. 4 illustratively depicts a partial cross-sectional view of the vibration-isolating bracket assembly referenced in FIG. 1 through FIG. 3.
Figure 5:
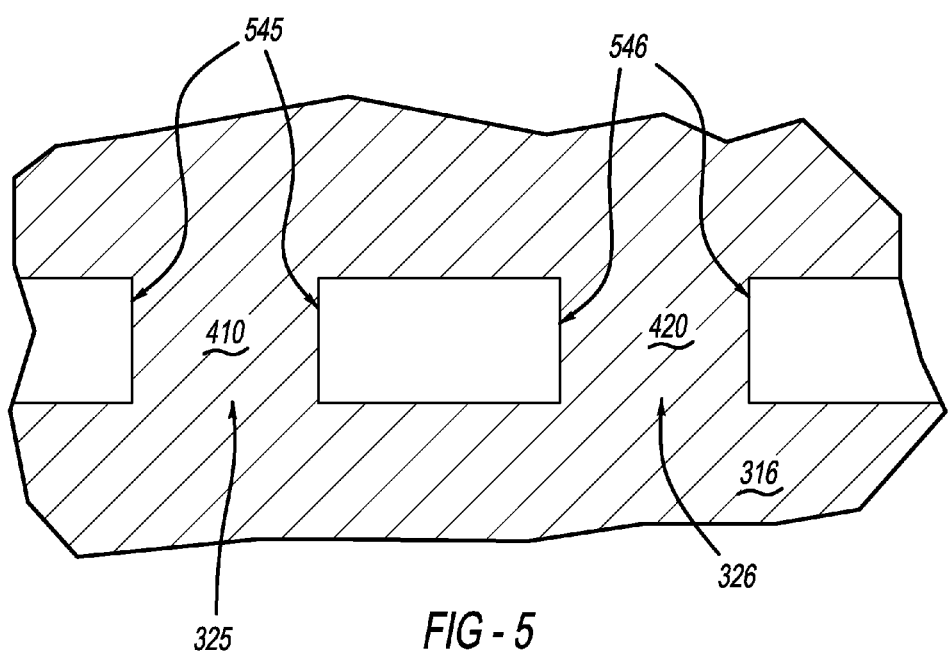
FIG. 5 illustratively depicts another partial cross-sectional view of the vibration-isolating bracket assembly referenced in FIG. 1 through FIG. 4.

The first aperture or main aperture 310 may be a through-aperture in the direction "W" as illustratively depicted in FIG. 4 and FIG. 2. By being a through-aperture, the main aperture 310 may be better positioned to impart additional stability to the entire isolator assembly 100. Alternatively and under certain design circumstances, such as when there is a space limitation particularly in the "W" direction, the main aperture 310 is with an open end and a close end, and therefore with a portion of the elastic donut 210 forming the closed end which contacts an edge 330 of the tongue 320.

Figure 3:
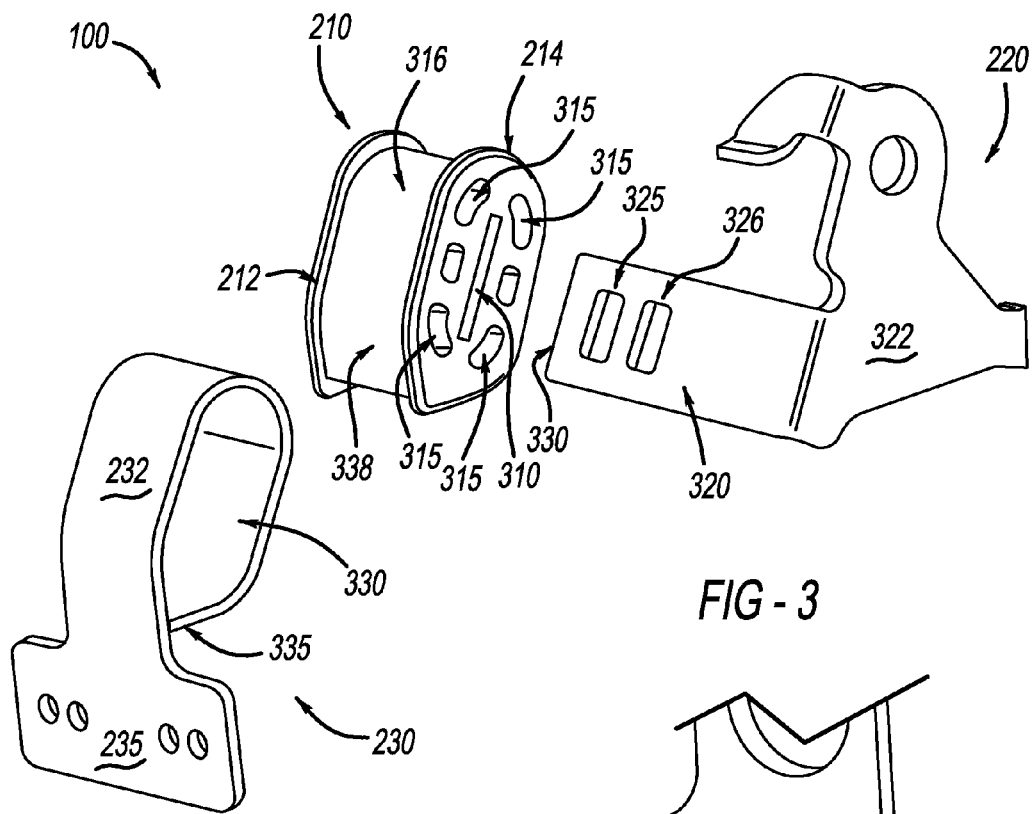
FIG. 3 illustratively depicts an exploded view of the vibration-isolating bracket assembly referenced in FIG. 2.

Further in view of FIG. 2, FIG. 3 and FIG. 4, the tongue 320 is of length L1 or height L2 greater in value than its depth D defined along direction W. L1/D or L2/D may be of any suitable ratios and may be no less than 5, 10, 15, 20, or 25 in certain embodiments.

In one or more embodiments, the elastic donut 210 may further include a pair of second or supplemental apertures 315, where the main aperture 310 may be positioned between the pair of supplemental apertures 315. The supplemental apertures 315 may also be through-apertures. This configuration may permit the elastic donut 210 to provide additional level of cushion and shock-absorbance, and to reduce material cost and/or assembly weight. In certain embodiments, and further in view of FIG. 3, six individual supplemental apertures 315 are positioned on two opposing sides of the main aperture 310. More or less than six of supplemental apertures 315, optionally with any suitable shape and/or configuration, may be employed as needed, dependent upon a particular project at hand, for instance, in view of its desirable value range of certain parameters such as distance between the first and second parts 120, 130, strength requirement involved, and allowance in noise or vibration.

The main aperture 310 is to receive at least a portion of the tongue 320 of the first bracket 220. The tongue 320 is illustratively depicted to be of generally flat in shape and is received through the main aperture 310. In certain embodiments, the tongue 320 may be of any suitable shape and configuration and may not pass through the main aperture 310. In other words, and as mentioned herein elsewhere, the main aperture 310 may have its end edge positioned within the main aperture 310.

Moreover, the tongue 320 defines thereupon the first through-aperture 325, the first portion 410 of the elastic donut 210 is received within the first through-aperture 325. As detailed herein elsewhere, and in certain embodiments, the first portion 410 of the elastic donut 210 fills up at least 90 percent or 95 percent of the fillable space available from the first through-aperture 325. Accordingly, the translational movement of the tongue 320 in one or more directions relative to the elastic donut 210 may be limited for stability. Similarly the rotational movement of the tongue 320 in one or more directions relative to the elastic donut 210 may also be beneficially limited. Referring back to FIG. 3 and FIG. 4, the tongue 320 may include the first and second through-apertures, 325, 326, or more. Optionally the first and second through apertures 325, 326 are spaced apart from each other. In this configuration, the first portion 410 of the elastic donut 210 is filled within the first through aperture 325 and the second portion 420 of the elastic donut 210 is filled within the second through-aperture 326. With this design, even greater stability may be provided to the connection between the tongue 320 and the elastic donut 210.

The tongue 320 is illustratively depicted as including two through-apertures, here 325, 326, arranged along a longitudinal direction of the tongue 320 and the through-apertures are depicted as rectangles with rounded corners. These configurations are not necessarily limiting. More or less through apertures may be positioned on the tongue 320 and may be of any suitable shape and configuration, such as rounds, ovals, rectangles, triangles, and any other suitable regular or irregular geometrical shapes.

Referring back to FIG. 2 and FIG. 3, the bracket assembly 100 further includes the second bracket 230 to support the elastic donut 210. The second bracket 230 may include a housing 330 to receive therein at least a portion of the elastic donut 210. In particular, and in view of FIG. 3, the elastic donut 210 may include side protrusions 212, 214 and a body portion 316 positioned between the side protrusions 212, 214. In a non-limiting assembly view, the body portion 316 may be enclosed within the housing 330 and the side protrusions 212, 214 remain outside of the housing 330 so as to stably fasten the elastic donut 210 relative to the housing 330 and to reduce the likelihood of their separation. In addition, the housing 330 may stably confine therein the elastic donut 210 and to limit certain unwanted rotational movement of the elastic donut 210 relative to the housing 330.

In one or more embodiments, and further in view of FIG. 3, the housing 330 may be configured to include a wedge portion 335 to further limit any unwanted rotational movement of the elastic donut 210 there-within. Accordingly, the elastic donut 210 may further include a wedge portion 338 of correspond to the wedge portion 335 of the housing 330. In this configuration, an engagement of the wedge portion 338 of the elastic donut 210 and the wedge portion 335 of the housing 330 is believed to impart additional level of stability against unwanted rotational movement between the elastic donut 210 and the housing 330.

In one or more embodiments, and further in view of FIG. 2 and FIG. 3, the elastic donut 210 and its body portion 316 in particular is configured not of a round outer shape, but of an irregular shape such as an oval outer shape for instance. The irregular shape with a non-limiting example thereof being of this oval outer shape, optionally along with the wedge portion 338, is believe to further limit any unwanted rotational movement and help enhance the assembly stability.

Referring back to FIG. 3, the wedge portion 335 is positioned at a lower part of the housing 330, or between the tongue 320 and the second connector portion 235 of the second bracket 230. The wedge portion 335 may also be of any suitable shape and configuration and be positioned at any suitable location relative to the housing 330. An alternative and non-limiting configuration may be that the wedge portion 335 be formed as a protrusion extending from an upper part of the elastic donut 210.

As mentioned herein elsewhere, one may connect the first vehicle part 120 to the second vehicle part 130 via the vibration-isolating bracket assembly 100.

In certain embodiments, the first bracket 220 may include a first connector portion 225 for its connection to the first vehicle part 120. The first connector 225 may be of any shape and/or configuration. In certain embodiments and further in view of FIG. 2, the first connector portion 225 is illustratively depicted as including an opening through which a shaft (not shown) may pass for connection to the first vehicle part 120. When as needed, the first connector portion 225 may be connected to the first vehicle part 120 via any suitable method including adhesion, welding, and nuts and bolts.

In certain embodiments, the first connector portion 225 may be formed integral to the first vehicle part 120. In addition, the first connector 225 may be formed integral to the tongue 320 or as a separate connectable component. Further in view of FIG. 2 and FIG. 3, the first connector portion 225 is illustrative depicted as integral to the tongue 320. This configuration may be particularly useful when the first bracket 220 is formed from a sheet material via bending and/or punching to arrive at the non-limiting shape and configuration shown with the first bracket 220 of FIG. 3. Accordingly the first bracket 220 may be provided with relatively enhanced manufacturing simplicity and cost efficiency.

Similarly, the second bracket 230 may include a second connector portion 235 to connect the second vehicle part 130. The second connector portion 235 may be of any shape and/or configuration. In certain embodiments and in view of FIG. 2, the second connector portion 235 is depicted to include one or more holes for connection via one or more fasteners (not shown) to the second vehicle part 130. When needed, the second connector portion 235 may be connected to the second vehicle part 130 via any suitable methods including adhesion, welding and nails and screws. In certain embodiments, the second connector portion 235 may be formed integral to the second vehicle part 130.

In addition, the second connector portion 235 may be formed integral to the housing 330, or be pre-formed and subsequently connected to the housing 330 as a separate component. Similarly, and further in view of FIG. 2 and FIG. 3, the second connector 235 is shown integral to the housing 330. This configuration may be particularly beneficial when the second bracket 230 in its entirety may be formed from a sheet material, optionally via bending and/or punching, to arrive at the shape and configuration illustratively depicted in FIG. 3. Accordingly, the second bracket 230 may be formed with relatively enhanced manufacturing simplicity and cost efficiency.

In one or more embodiments, the present invention as set forth herein provides vibration isolating bracket assembly. One skilled in the art will readily recognize from such discussion, and from the accompanying drawings and claims that various changes, modifications and variations can be made therein without departing from the true spirit and fair scope of the invention as defined by the following claims.

What is claimed is:

1. A vibration-isolating bracket assembly, comprising:
   an elastic donut including a main aperture;
   a first bracket including a tongue with at least a portion thereof being received within the main aperture, the tongue including a first through-aperture and a second through-aperture spaced apart from the first through-aperture, a first portion of the elastic donut being received within the first through-aperture and a second portion of the elastic donut being received within the second through-aperture; and
   a second bracket to support the elastic donut.

2. The vibration-isolating bracket assembly of claim 1, wherein the second bracket includes a housing to at least partially receive the elastic donut.

3. The vibration-isolating bracket assembly of claim 2, wherein the housing includes a wedge portion to limit movement of the elastic donut.

4. The vibration-isolating bracket assembly of claim 3, wherein the second bracket includes a second connector portion to connect a second vehicle part, the wedge portion being positioned between the tongue and the second connector portion.

5. The vibration-isolating bracket assembly of claim 1, wherein the first bracket further includes a first connector portion to connect a first vehicle part and the second bracket further includes a second connector portion to connect a second vehicle part.

6. The vibration-isolating bracket assembly of claim 5, wherein the first connector portion and the tongue are integral to each other in material.

7. The vibration-isolating bracket assembly of claim 5, wherein the second bracket further includes a housing to at least partially receive the elastic donut and the second connector portion is integral to the housing in material.

8. The vibration-isolating bracket assembly of claim 1, wherein the first bracket differs in material from the second bracket.

9. The vibration-isolating bracket assembly of claim 1, wherein the tongue is of a length (L1), a height (L2) and a depth (D), at least one of ratio L1/D and ratio L2/D being no less than 5.

10. A vibration-isolating bracket assembly comprising:
    an elastic donut including a pair of supplemental apertures and a main aperture positioned there-between;
    a first bracket including a tongue with at least a portion thereof being received within the main aperture, the tongue including a first through-aperture, a portion of the elastic donut being received within the first through-aperture; and
    a second bracket including a housing to receive at least a portion of the elastic donut.

11. The vibration-isolating bracket assembly of claim 10, wherein the tongue includes a second through-aperture spaced apart from the first through-aperture, a second portion of the elastic donut being received within the second through-aperture.

12. The vibration-isolating bracket assembly of claim 10, wherein the housing includes a wedge portion to limit movement of the elastic donut.

13. The vibration-isolating bracket assembly of claim 10, wherein the tongue is of a length (L1), a height (L2) and a depth (D), at least one of ratio L1/D and ratio L2/D being no less than 5.

14. A vibration-isolating bracket assembly, comprising:
 an elastic donut including a pair of supplemental apertures and a main aperture positioned there-between;
 a first bracket including a tongue with at least a portion thereof being received within the main aperture, the tongue including a first through-aperture, a portion of the elastic donut being received within the first through-aperture; and
 a second bracket to support the elastic donut.

15. The vibration-isolating bracket assembly of claim 14, wherein the first bracket further includes a first connector portion to connect a first vehicle part.

16. The vibration-isolating bracket assembly of claim 15, wherein the first connector portion and the tongue are integral to each other in material.

17. The vibration-isolating bracket assembly of claim 14, wherein the second bracket further includes a second connector portion to connect a second vehicle part.

18. The vibration-isolating bracket assembly of claim 14, wherein the first bracket differs in material from the second bracket.

19. The vibration-isolating bracket assembly of claim 14, wherein the tongue is of a length (L1), a height (L2) and a depth (D), at least one of ratio L1/D and ratio L2/D being no less than 5.

\* \* \* \* \*